(12) United States Patent
Bhogal et al.

(10) Patent No.: US 10,348,845 B2
(45) Date of Patent: Jul. 9, 2019

(54) METHOD AND SYSTEM TO IDENTIFY DATA AND CONTENT DELIVERY ON A CELLULAR NETWORK USING A SOCIAL NETWORK

(71) Applicant: INTERNATIONAL BUSINESS MACHINES CORPORATION, Armonk, NY (US)

(72) Inventors: Kulvir S Bhogal, Fort Worth, TX (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 15/141,500

(22) Filed: Apr. 28, 2016

(65) Prior Publication Data

US 2017/0318107 A1    Nov. 2, 2017

(51) Int. Cl.
| G06F 15/16 | (2006.01) |
| H04L 29/08 | (2006.01) |
| H04L 12/58 | (2006.01) |
| G06Q 30/02 | (2012.01) |
| G06Q 50/00 | (2012.01) |
| H04L 12/26 | (2006.01) |

(52) U.S. Cl.
CPC ............ H04L 67/26 (2013.01); G06Q 30/02 (2013.01); G06Q 50/01 (2013.01); H04L 51/32 (2013.01); *H04L 43/0876* (2013.01)

(58) Field of Classification Search
CPC ......... H04L 67/26; H04L 51/32; G06Q 30/02; G06Q 50/01
USPC ......................................................... 709/224
See application file for complete search history.

(56) References Cited

U.S. PATENT DOCUMENTS

| 6,456,234 B1 | 6/2002 | Johnson |
| 7,187,997 B2 | 3/2007 | Johnson |
| 8,751,618 B2 | 6/2014 | Bhatt |
| 8,938,488 B1 | 1/2015 | Sayed |
| 8,943,047 B1* | 1/2015 | Carpio .................. G06Q 10/06 707/723 |
| 9,378,191 B1* | 6/2016 | Raghunathan ........ G06F 17/218 |
| 2005/0278443 A1 | 6/2005 | Winner |
| 2012/0278476 A1 | 11/2012 | Agrawal |
| 2014/0006538 A1 | 1/2014 | Oikonomou |
| 2014/0282636 A1 | 9/2014 | Petander et al. |
| 2014/0369188 A1* | 12/2014 | Seleznyov .............. H04W 4/50 370/229 |
| 2016/0021208 A1* | 1/2016 | Freiman ................ G06F 1/3265 709/203 |
| 2017/0318107 A1* | 11/2017 | Bhogal .................. H04L 67/26 |

* cited by examiner

*Primary Examiner* — Thanh T Nguyen
(74) *Attorney, Agent, or Firm* — Rochester Patent Center

(57) ABSTRACT

An approach is defined to establish consumption analytics of network nodes of a social network. Content is tagged and the content consumption analytics are derived from the content consumption. The content analytics and related heuristic is applied to new content shared in the social network. The content is compared to policies for content push operations and cellular network constraints to determine whether the content is proactively pushed to a mobile device.

20 Claims, 6 Drawing Sheets

METHOD AND SYSTEM TO IDENTIFY DATA AND CONTENT DELIVERY ON A CELLULAR NETWORK USING A SOCIAL NETWORK

BACKGROUND

The present invention relates to content delivery over a cellular network and more specifically, to identify content to deliver over the cellular network using a social network.

Content delivery of a cellular, or mobile, network provides data and content to mobile communication device users, usually in the form of music, games, videos, pictures, and the like. The user views possible content on their device and selects it for delivery. Due the increasing number of devices and infrastructure limitations, delivery of this content may be delayed.

Social networks are another service that takes advantage of cellular communication networks. These platforms allow one to build a social network among users who become members of the social network. Most social network services are web-based and provide the ability for users to communicate with each other over great distances. Social network platforms let users share ideas, activities, pictures, messages, or events with other social network members.

BRIEF SUMMARY

Methods, devices and manufactures that support delivering of content over a cellular network are provided. Embodiments may include a computer program product. Embodiments may also include a computer method. Embodiments may provide for a computer system.

Embodiments may disclose a computer program product for delivering content to a mobile device over a cellular network using a social network. The computer program comprises a computer readable storage medium having program instructions embodied therewith. The program instructions are readable by a processor to cause the process to perform a method.

In embodiments, the method includes identifying content posted within the social network. The method also includes performing an analysis to determine a likelihood of the content being selected based on aggregated data within the social network corresponding to a social network application on the mobile device. The method also includes comparing the likelihood of the content being selected to a policy stored in a policy database associated with the social network. The method also includes determining whether the cellular network is allowed to deliver the content. The method also includes pulling the content for delivery to the mobile device.

Many variations of the invention beyond those explicitly described are possible. Moreover, modifications to the embodiments described herein are also possible. These modifications and variants may include various combinations of the embodiments described herein, various modifications to the embodiments described herein, use of portions of embodiments described herein, and still further teachings of the application in other environments and uses.

DETAILED DESCRIPTION

Figure 1:
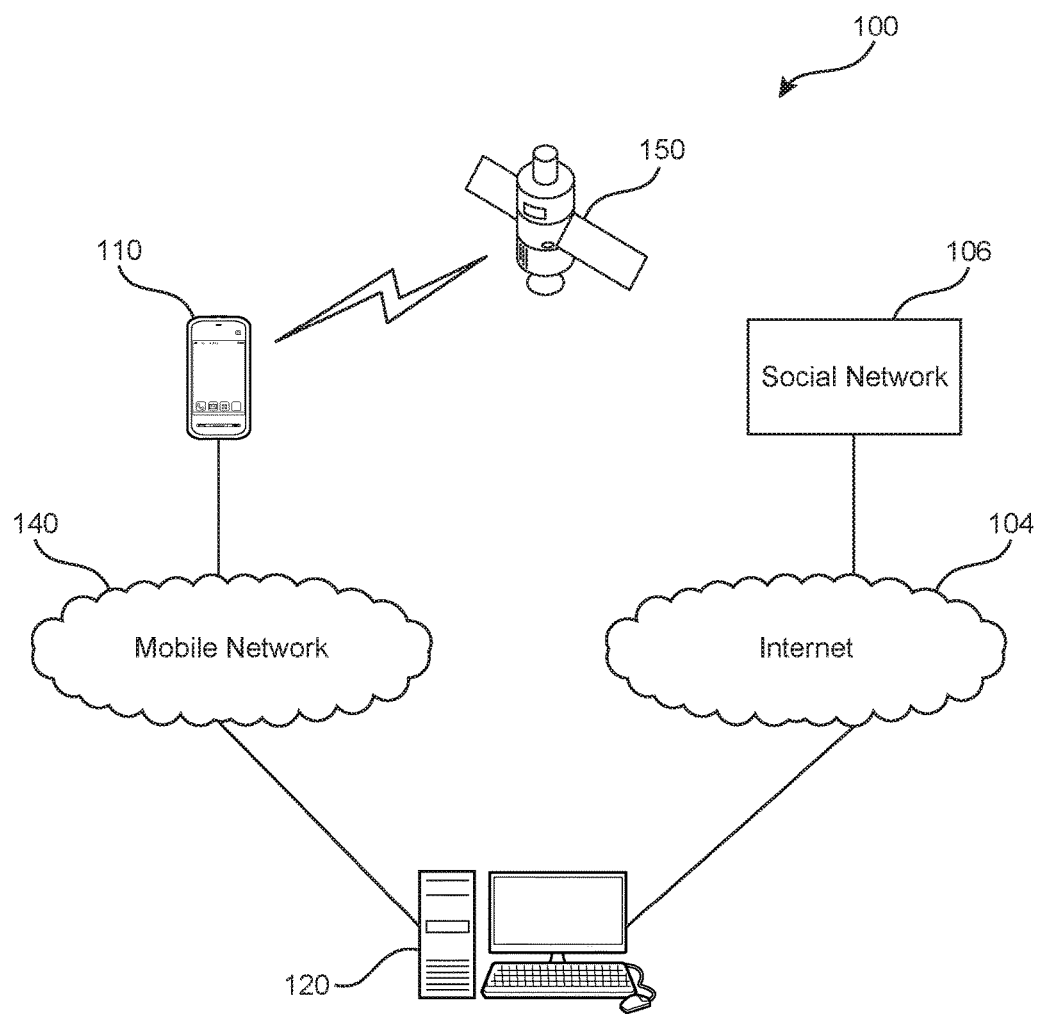
FIG. 1 is a depicts a system for identifying data and content delivery over a cellular network using a social network as may be employed in various embodiments of the invention.

Methods, devices and manufactures support having a social network work symbiotically with a cellular, or mobile, network. The social network works proactively to cache data on an end user's mobile device by taking into account the likelihood of a particular set of content being requested by the device. According to some embodiments, content delivery is based on a higher degree of likelihood of consumption of the data and content. The overlap of technology collaboration between the social network and the cellular network (infrastructure) allows for a policy driven approach to consent on data delivery to the mobile device. This reduces the stress on the cellular network, especially on the small and back haul infrastructure.

Prefetching of content in a cellular network allows the content to be available to a device on the network in a faster manner. Various tools may be used to determine this content. The disclosed embodiments go beyond the prefetch of content, or any cost benefit analysis, to leverage the cellular networks to determine the likelihood of the content. This determination does not just use a social graph but also heuristics and a policy driven approach based on learning and unlearning algorithms along with the dynamicity of content consumption. This process may be more granular than simple prefetch operations.

The identified network nodes, or users, may be shared with social networks/content providers and cellular networks. The information for these nodes may include user identifications, device identifications, application identifications, and the like. The content subsequently is matched with policy services for data/content push to the mobile device. This feature may provide an optimized edge to the specific device.

Cellular networks seek to deliver data content to their users faster to keep the users satisfied with the delivery speed of the requested content. Moreover, these networks seek to reduce the strain on the network due to the content delivery. One way to provide content quickly to end users is using proactive pushing and caching of content on cellular devices.

This process, however, faces a fundamental dilemma, which is what content should be cached? Not everything can be cached due to memory space and bandwidth constraints.

The cached content is to be selected according to what is most likely to be used. For example, if the network allows delivery of one video, then the cached video should be the one most likely to be viewed.

The disclosed embodiments may have cellular networks work symbiotically with data from social networks to determine which content will most likely be requested by the end user of a mobile device based on his/her prior social network interactions between social network contacts and groups. Thus, some embodiments work by having one or more social network interact symbiotically with a cellular network to proactively cache data and content on the mobile device using the interactions.

When content, such as video, audio, graphic, or web pages are linked on a social network, a historical analysis may be performed to determine the likelihood of the user selecting, or "clicking," to retrieve such content. This analysis, for example, may determine who the content of the user is that posted the content. Using this example, a historical analysis may be performed to determine that Kulvir has an 80% chance of selecting a link to a video that is posted by his friend Nitin. The historical analysis performed by the disclosed embodiments, however, determines that Kulvir only has a 20% chance of watching selecting a link to a video posted by his friend Chris.

In addition, a user adjustable policy may exist on the user's mobile device to proactively load content onto the device for near term playback. For example, such a policy may determine that the likelihood of playing back a video that was posted to a popular social network platform is above 50%, then the disclosed process would proactively pull the video over the cellular network and cache it on the device.

This identification of the video may be performed in a strategic manner that places less stress on the cellular network as used by the end user of the mobile device. The social network application on the device may be alerted to only pull down content proactively when the cellular network indicates that it is facing a lull point in its usage. Conversely, when the cellular network is facing a stressful bandwidth issue, it may inform the social network application not to download proactively at that time. Accordingly, the social network application and the cellular network may work in a symbiotic fashion. Preferably, the social network may cache content more aggressively in a wireless network setting as opposed to a cellular network.

Thus, embodiments may define a continual approach to establish consumption analytics of the immediate and extended, or associated, network nodes of a social network. The content may be tagged based on type, source, length, and the like. The content consumption analytics may be derived from content consumption by the immediate and associated network. The content analytics and related heuristic then may be applied for all new content created or shared. The tagged nodes in the social network are identified. The identified network nodes, or users, may be shared with social networks or content providers and the cellular networks. The content may be subsequently matched with policy services for data content push. The content is proactively pushed to the mobile device to provide an optimized edge to the specific device.

In some embodiments, a heuristic may be defined as a technique designed for solving a problem in a timelier manner when traditional methods are too slow. Another definition may be finding an approximate solution when the traditional methods fail to find any exact solution. This may be achieved by trading optimality, completeness, accuracy, or precision for speed. A heuristic may be considered a shortcut.

A heuristic function, also known simply as a heuristic, is a function that ranks alternatives in search algorithms at each branching step based on available information to decide which branch to follow. For example, a heuristic function may approximate the exact solution. Thus, an objective may be to produce a solution in a reasonable time frame that is good enough for providing content to the mobile device over the cellular network. Using some embodiments, the prefetching of the content does not require a prohibitively long time.

FIG. 1 depicts a system 100 for identifying data and content delivery over a cellular network using a social network according to some embodiments. System 100 may include a mobile device 110 and a server 120. Server 120 may act as a content aggregating device. Mobile device 110 communicates with server 120 via cellular, or mobile, network 140. Server 120 also may connect to the Internet 104. In addition, if mobile device 110 is provided with satellite positioning functionality, a satellite 150 may provide mobile device 110 with its location information, such as latitude and longitude coordinates.

System 100 also includes social network 106. Social network 106 also may be referred to as a social network platform, social media, and the like. Mobile device 110 may be provided with a software program, or an application, which when executed may connect to social network 106. This connection may occur via cellular network 140 and Internet network 104. The installed application may allow the user of mobile device 110 to view content from social network 106 on the mobile device. The application also may store information about the user, such as user identification, device identification, application identification, contacts, and the like.

Figure 2:
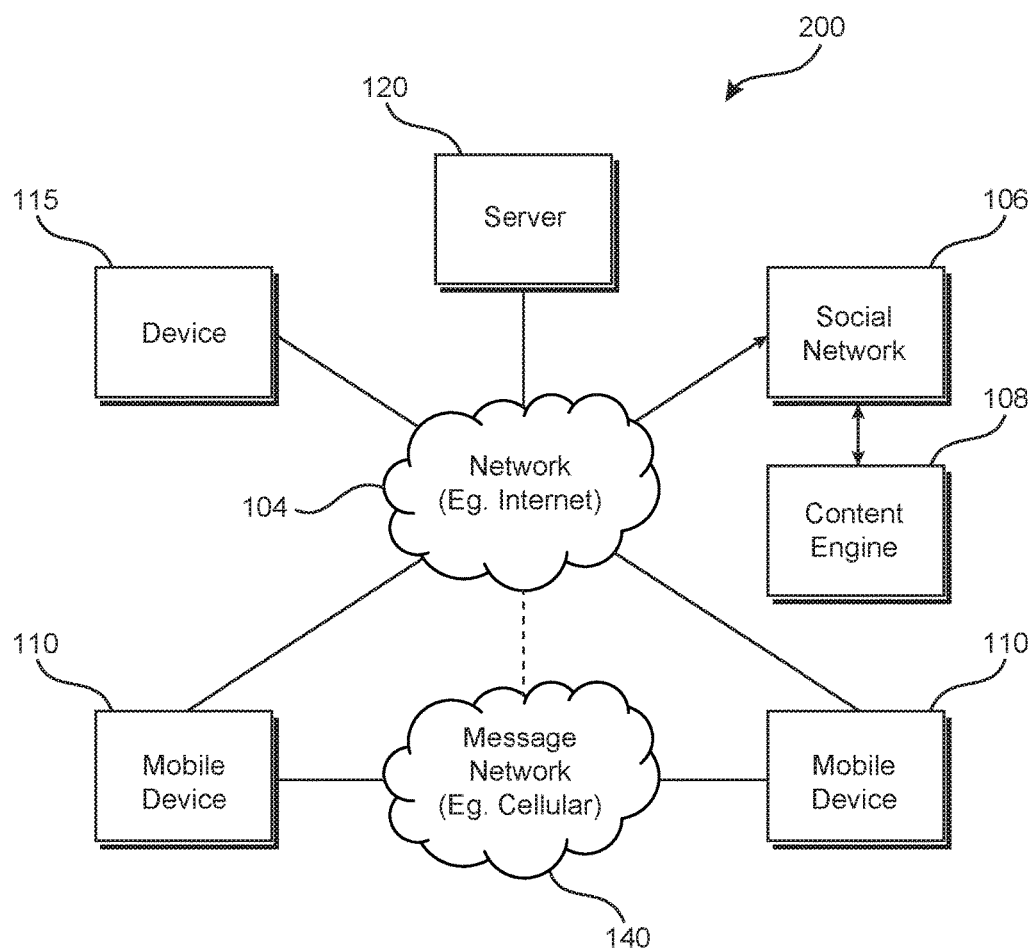
FIG. 2 depicts another system for identifying data and content delivery over a cellular network using a social network as may be employed in various embodiments of the invention.

FIG. 2 depicts another system 200 for identifying data and content delivery over a cellular network 140 using a social network 106 according to some embodiments. System 200 may resemble system 100 disclosed above, except the system shown in FIG. 2 shows a direct connection to the Internet network 104, such as through a wireless network. Further, more than one mobile device 110 may be coupled to cellular network 140 and social network 106.

Communication may occur within system 200 via cellular network 140 or associated Internet network 104. Cellular network 140, for example, transmits and receives messages and content as data is pushed or pulled within system 200. Internet network 104 may be a Wi-Fi network, a wide area network, a local area network, and the like.

One or more servers 120 may also communicate with other components in system 200. Servers 120 may represent websites, databases, memory storage, computers and the like. Networks 140 and 104 may represent one or more interconnected networks, over which various systems and hosts may communicate and may comprise packet-based wide area networks (such as the Internet), private networks, wireless networks, satellite networks, cellular networks, and the like. System 200, however, is illustrative and may include other components and devices.

Mobile devices 110 and desktop device 115 along with servers 120 are operably connected to cellular network 140 or Internet network 104 via a network service provider, a telephone service provider, a wireless carrier, and the like. Each client device or server may generally be a computer, computing system, or computing device that includes functionality for communicating remotely over system 200.

According to some embodiments, mobile devices 110 are able to send and receive data over networks 104 and 140.

Mobile devices 110 also run applications that use the data to perform functions for the user. One of these applications may connect the mobile device to social network 106. Social network 106 is disclosed in greater detail below. Social network 106 may allow access to content engine 108.

Thus, as shown in FIGS. 1 and 2, a mobile device 110 may connect to mobile network 140 and then to social network 106 via server 120. Alternatively, mobile device 110 may connect directly to social network 106. In these systems, however, there is an overlap of technology collaboration between cellular network 140 and social network 106. Cellular network 140 and social network 106 may work symbiotically together to proactively cache content and data on a mobile device 110 according the embodiments disclosed below.

Figure 3:
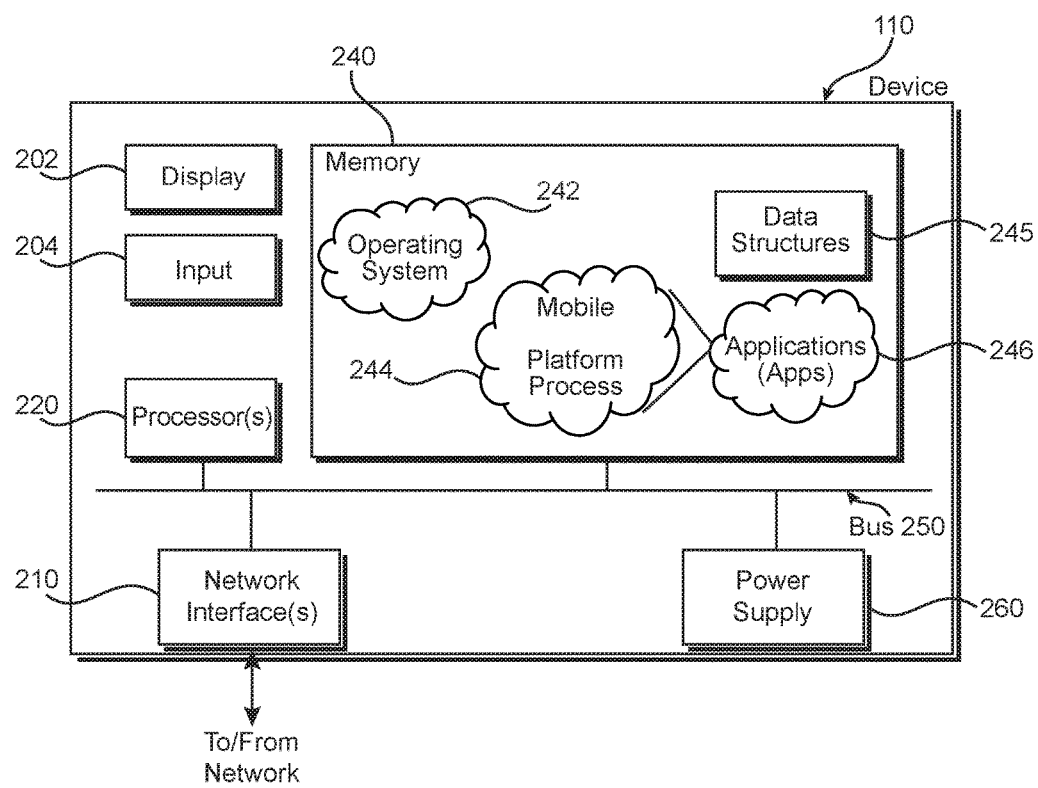
FIG. 3 is a block diagram of a mobile device as may be employed in various embodiments of the invention.

FIG. 3 depicts a block diagram of a mobile device 110 according to the disclosed embodiments. Desktop devices 115 and servers 120 also may incorporate some features of mobile device 110 in providing the functionality disclosed below. In short, the components shown in FIG. 3 may be found in any of devices 110, 115, and 120.

Mobile device 110 includes one or more network interfaces 210, at least one processor 220, and a memory 240 interconnected by a system bus 250. Power supply 260 supplies power to device 110 as well as the components disclosed therein. Other components may be included in device 110, such as a display 202 and input module 204. Display 202 provides visual information to the user and shows the icons for different applications 246 stored on device 110. Input module 204 may include a graphical user interface (GUI), keyboard, mouse, and the like that allows the user to interact with device 110 and input instructions or commands to launch or interact with applications running on the mobile device.

Network interface(s) 210 contain the mechanical, electrical, and signaling circuitry for communicating data over links coupled to a communications network, such as networks 104 and 140. Network interfaces 210 may be configured to transmit or receive data using a variety of different communication protocols. Further, device 110 may include two or more different types of connections for network interfaces 210, such as a wired/physical, wireless, or cellular, and the like. Network interfaces 210 also may be configured as a general image input device, such as a code scanner, image detector, and the like.

Memory 240 includes a plurality of storage locations that are addressable by processor 220 for storing software programs and data structures 245 associated with these programs. The software programs include applications that reside in memory 240 until launched by processor 220. Processor 220 includes hardware elements or hardware logic adapted to execute the software programs and manipulate data structures 245.

An operating system 242, which resides in memory 240 and is executed by processor 220, functionally organizes mobile device 110. These software processes or services may comprise a mobile platform process 244, in addition to one or more applications, or apps, 246. Applications 246 may each be configured depending upon the particular mobile device 110 within system 100 or 200.

Other processor and memory types, including various computer-readable media, may be used to store and execute program instructions pertaining to the techniques described herein. While the disclosed embodiments illustrate various processes, it is expressly contemplated that various processes may be embodied as modules configured to operate in accordance with the functions disclosed below. While the processes have been shown separately, those skilled in the art will appreciate that processes may be routines or modules within other processes.

Mobile platform process 244 and applications 246 may each contain computer executable instructions executed by processor 220 to perform various functions. For example, applications 246 may include one or more specific or integrated applications, such as a web browser to access and view content over network 104 or 140. Other specific applications 246 may include such feature specific applications such as music player apps, consumer product purchasing apps, travel apps, social media apps, banking or financial apps, messaging apps, and the like.

The functionality disclosed below may be performed by hardware, software, or firmware, such as in accordance with mobile platform process 244, which contains computer executable instructions executed by processor 220 to perform the functions corresponding to the apps.

On mobile device 110, the various applications 246 may be represented graphically by an icon. An icon is a pictogram displayed on a screen in order to help a user navigate a computer system. The icon is a quickly comprehensible symbol of an application 246. It can serve as an electronic hyperlink or file shortcut to access the application that it represents. The application is activated to turn mobile device 110, for example, from a computing platform to a specific purpose platform. The user activates the icon by using a mouse, pointer, finger, or even voice commands. The placement on display 202 in relation to other icons may be set according to some criteria or by the user. In activating an application using an icon, the user can move directly in and out of the identified application without knowing anything about the location or requirements of the data structures, or code.

One of applications 246 corresponds to social network 106. When launched, social network application 246 may configure mobile device 110 to be a special purpose machine to interact with members within social network 106. As such, the user of mobile device 110 generates data by requesting content from social network 106.

Social network 106 according to some embodiments is disclosed in greater detail below. Preferably, social network 106 generates dynamic relationship-based content personalized for members. More preferably, this content is based upon relationships between members with friends or contacts. One or more members using mobile devices 110 are coupled to social network 106 via networks.

Social network 106 may host a website that allows one or more members to communicate with other members via the website. A first member associated with a mobile device 110 may communicate with a second member associated with one or more second member devices 110 via the social networking website associated with social network 106. The social networking website may offer the member an opportunity to connect or reconnect with one or more other members having a professional or personal relationship.

As shown in FIG. 2, content engine 108 is coupled to social network 106. Content engine 108 utilizes action and relationship data about members to generate dynamic relationship-based content personalized for members of social network 106. According to some embodiments, mobile device 110 may be directly coupled to content engine 108. In other embodiments, content engine 108 comprises a module associated with social network 106.

Figure 4:
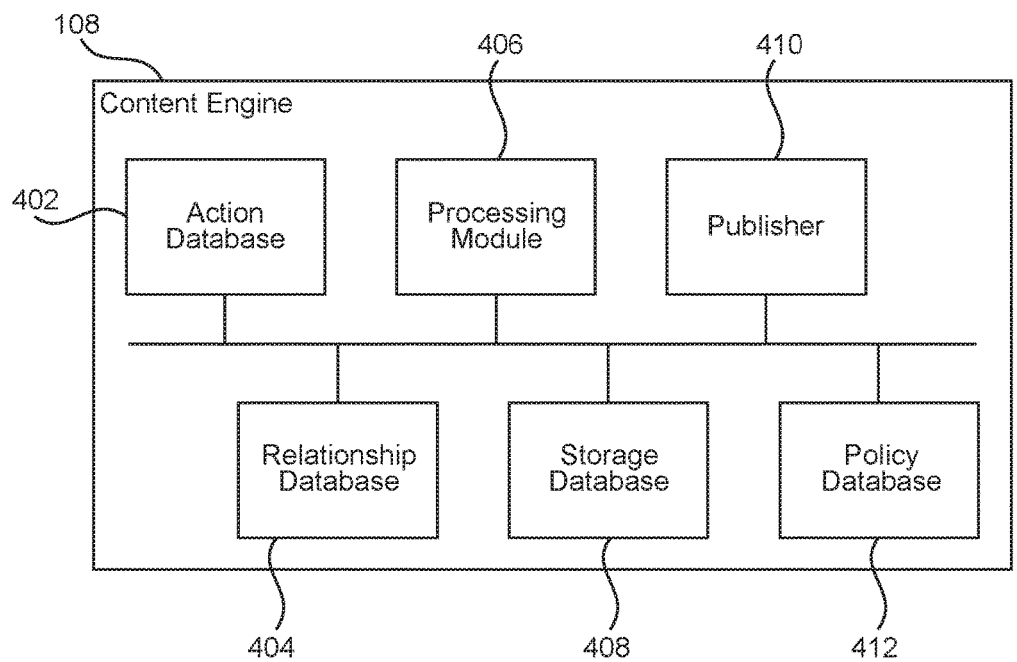
FIG. 4 is a block diagram of content engine as may be employed in various embodiments of the invention.

FIG. 4 depicts a block diagram of content engine 108 according to some embodiments. Content engine 108 includes an action database 402, relationship database 404, processing module 406, storage database 408 and publisher 410. Action database 402 may store one or more member actions or activities on social network 106. For example, action database 402 may store member actions with one or more items of content, such information, relationships, stories, pictures, videos, audio files, profiles, articles of interest, news, and the like along with member profiles and information provided by social network 106.

Relationship database 404 is provided for storing relationship data associated with each of the members of social network 106, such as the member associated with mobile device 110. Relationship database 404 includes a member profile for each member of social network 106. When a member joins social network 106, a member profile may be generated for the member. The member can specify relationships with one or more other members via the member profile, or by any other means. The member can assign categories, groups, networks and so forth to the one or more other members with whom the member has a relationship. The relationship may use a relational factor. When the member updates information in the member profile, such as adding new contacts or members, the member profile in relationship database 404 may be updated with the added information.

Processing module 406 is provided for performing several functions as described below. Among other things, processing module 406 is responsible for associating member actions with member relationship data to produce consolidated data. Processing module 406 identifies one or more elements associated with the consolidated data and aggregates the consolidated data based on the one or more elements to produce aggregated consolidated data. Processing module 406 may weight by affinity the aggregated consolidated data to generate dynamic relationship-based content personalized for members of social network 106. In other words, social network 106 may utilize algorithms or other processes to present potential content from associated members to the member.

Storage database 408 may be provided for storing the generated dynamic relationship-based content personalized for the members of social network 106. Policy database 412 may store policies on providing the content to mobile device 110 when connected to cellular network 140. Policy database 412 may be disclosed in greater detail below. Based on information generated within content engine 108, policies may be enacted that provide guidelines on when to prefetch content to deliver to mobile device 110.

In alternative embodiments, relationship database 404, storage database 408, and policy database 412 may be combined into a single database having a database manager to manage the different memory structures to provide the functionality to support social network 106. In other embodiments, these databases may be located separate from content engine 108 within social network 106. For example, policy database 412 may be located at server 120 due to its close interaction with cellular network 140.

Publisher 410 may be provided for publishing the generated dynamic relationship-based content personalized for mobile devices 110 of the members of social network 106. Publisher 410 may include a server configured to send the generated dynamic relationship-based content to a member for whom the content has been personalized. Publisher 410 is configured to format content in a predetermined arrangement style for presentation to mobile device 110 connected to social network 106.

Although content engine 108 is disclosed as being comprised of various components shown in FIG. 4, content engine 108 may include additional components not described here for brevity. Processing module 406 of content engine 108 is disclosed in greater detail below.

Figure 5:
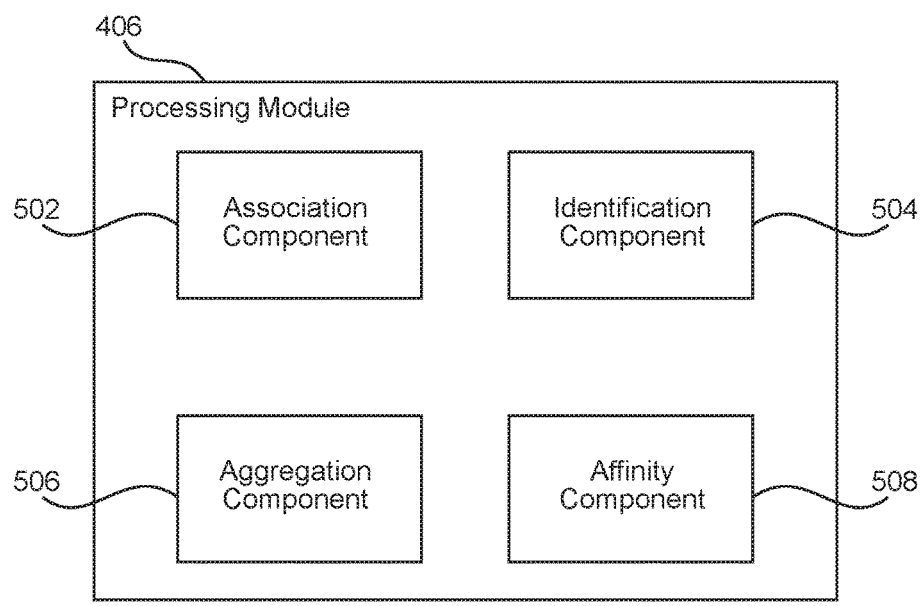
FIG. 5 is a block diagram of a processing module as may be employed in various embodiments of the invention.

FIG. 5 is a block diagram of processing module 406 according to some embodiments. Processing module 406 includes an association component 502, an identification component 504, an aggregation component 506 and an affinity component 508.

Association component 502 is configured to associate one or more member actions with the member's relationship data to produce consolidated data. Identification component 504 may be provided as part of processing module 406 to identify one or more elements associated with the consolidated data. Identification component 504 may identify any element of an action associated with relationship data to form consolidated data. For example, identification component 504 may identify an element based on action type, members involved, media or content type, or multiple elements thereof. The identified elements are used to aggregate consolidated data.

Aggregation component 506 is provided to aggregate the consolidated data based on the one or more elements to produce aggregated consolidated data. For example, aggregation component 506 might utilize parameters or criteria for aggregation. These parameters or criteria may be set by the member.

Affinity component 508 is provided to weight by affinity the aggregated consolidated data to generate dynamic relationship-based content personalized for members of social network 106. Based on one or more member activities and associated relationships, an affinity for past, present or future member-related content may be determined by affinity component 508. Any type of variable may be considered when determining an affinity for affinity component 508 to weight the aggregated consolidated data. Affinity component 508 may be utilized to assign an order to the content presented to the member.

Figures 6, 7:
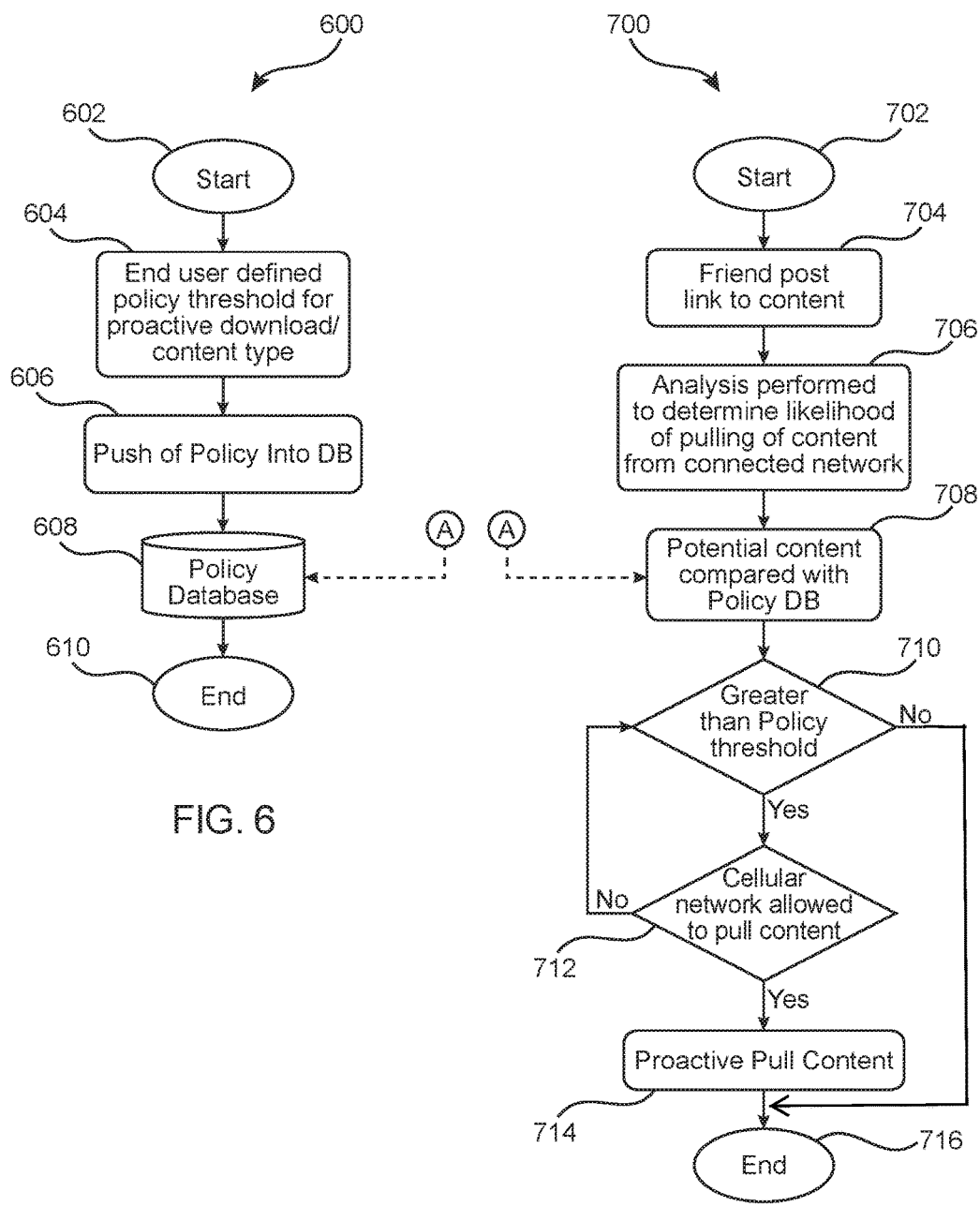
FIG. 6 shows a flowchart for generating a policy for identifying content for delivery over a cellular network using a social network, as may be employed in accord with embodiments of the invention.
FIG. 7 shows a flowchart for identifying content for delivery over a cellular network using a social network, as may be employed in accord with embodiments of the invention.

FIG. 6 depicts a flowchart 600 for generating a policy for identifying content for delivery over a cellular network using a social network according to some embodiments. Where applicable, the disclosure of FIG. 6 may refer to components of FIGS. 1-5 for illustrative purposes. The embodiments disclosed by flowchart 600, however, are not limited to the features shown in the previous figures.

Step 602 executes by starting the flow process of flowchart 600. For example, a user may want to create or update their policy for prefetching content, so he/she logs onto social network 106. In other embodiments, mobile device 110 through application 246 for social network 106 may begin step 602.

Step 604 executes by defining an end user policy threshold for use in proactive download/content type. The user of mobile device may set various limits, such as 50%, 75%, 90%, and the like that content should meet before being prefetched according to the disclosed process. Cellular network 140 also may set limits so as to not overburden its infrastructure. In other words, cellular network 140 may have its own policy that any prefetched content must have a 50% likelihood of being selected by the user. Other policies may prevent inappropriate prefetched content from being delivered, such as adult content, offensive content, and the like.

In other embodiments, step 604 may retrieve information collected and aggregated by content engine 108 in determining policies. More specifically, the data generated by association component 502, identification component 504, aggregation component 506, or affinity component 508 of processing module 406 may be used to define the policies. This may occur looking at the data for the most visited pages, most interactive members, and the like.

Step 606 executes by pushing the defined policy to the policy database, such as policy database 412. Step 608 executes by storing the policy in the policy database. Thus, policy database 412 may store the policies associated with members according to their identification information. As noted above, policy database 412 is shown in content engine 108, but may be located wherever it is accessible to cellular network 140. In other embodiments, policy database 412 may be located within mobile network 140. Step 610 executes by ending flowchart 600.

FIG. 7 depicts flowchart 700 for identifying data and content delivery over a cellular network using a social network according to some embodiments. Where applicable, the disclosure of FIG. 7 may refer to components of FIGS. 1-5 for illustrative purposes. The embodiments disclosed by flowchart 700, however, are not limited to the features shown in the previous figures.

Step 702 executes by starting the process shown in FIG. 7. Step 704 executes by a friend of the member of social network 106 posting content. The post may include a link to the content, such as a link to a video, an audio file, a picture, a web page, and the like.

Step 706 executes by performing a historical analysis to determine a likelihood of pulling of content from connected network. Such an analysis may include a heuristic to determine the likelihood of the member selecting the content to view on mobile device 110. As noted above, aggregated and consolidated data collected by social network 106 and content engine 108 may be used in the heuristic analysis. Thus, cellular network 140 may review this data by accessing the databases storing such data within social network 106. Alternatively, social network 106 may make such data available via databases located elsewhere, such as server 120.

Step 708 executes by comparing the potential content identified in step 706 to the policies stored in the policy database. As shown in FIGS. 6 and 7, step A links step 706 with step 608. This step accesses the policies defined by the end user or other entities. These policies may have thresholds or other criteria to prevent reduce the amount of prefetched content sent to mobile device 110.

Step 710 executes by determining whether the potential content meets the criteria set forth in the policy database, such as the likelihood of being selected by the user of mobile device 110 being greater than a specified threshold. Thus, if the likelihood for a video identified in step 706 is greater than 80%, as defined by the policy, then it should be tagged for prefetching. The percentage likelihood for pictures may be lower, such as 60%, as pictures usually do not demand as much as mobile network resources as videos.

If step 710 is yes, then step 712 executes by determining whether cellular network 140 is allowed to pull the content for the prefetch operations. Cellular network 140 may set parameters on when prefetch operations can occur. As noted above, if infrastructure is not able to pull content due to resources being tied up, then no prefetch will take place. This step also may be used to prevent unauthorized content from being tagged for delivery.

If step 712 is yes, then step 714 executes by proactively pulling the content posted in step 704 for the prefetch operations and to be provided to mobile device 110. The content may be forwarded to the cache for mobile device 110 based on the heuristic analysis of data provided from social network 106. If step 712 is no, then flowchart returns to step 710 to wait until the content may be pulled.

If step 710 is no, then flowchart 700 goes to step 716, which ends the operation. Further, after the content is pulled in step 714, the process ends with step 716.

Figure 8:
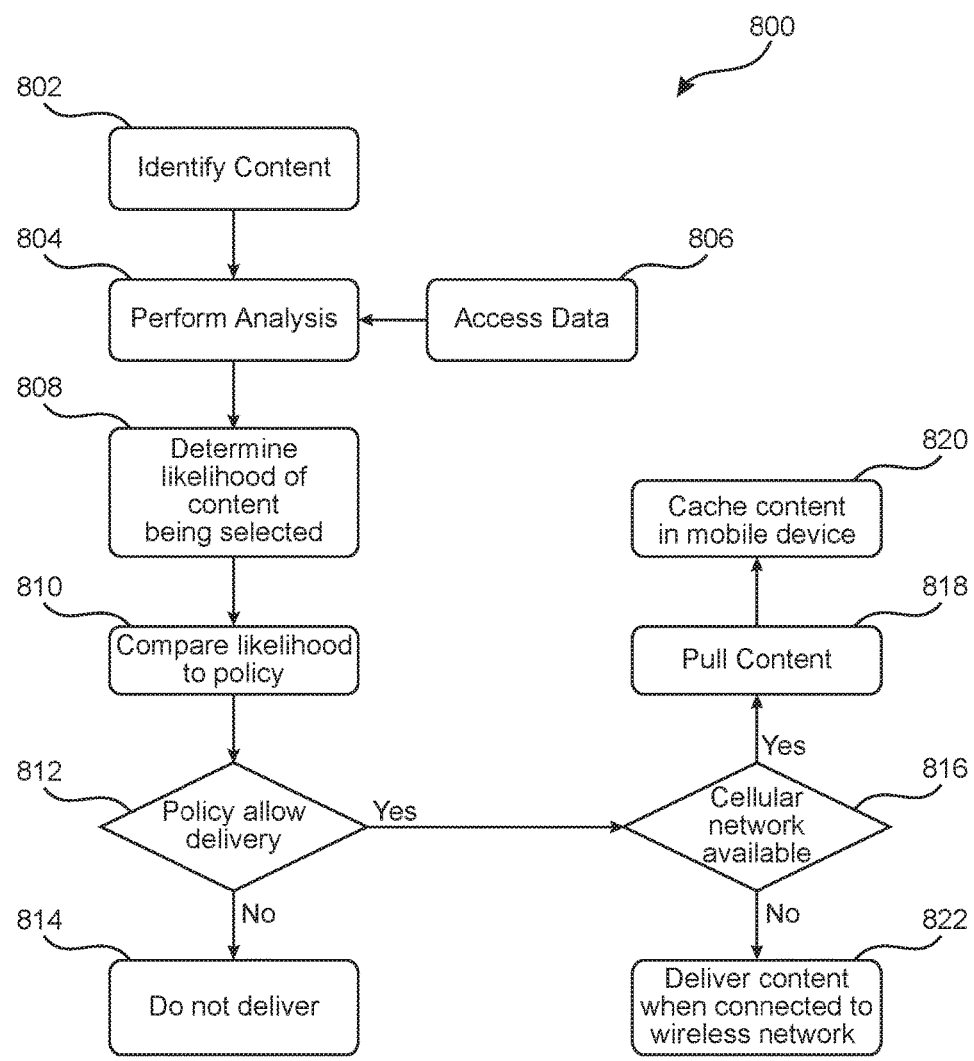
FIG. 8 shows a flowchart for identifying and delivering content over a cellular network using a social network, as may be employed in accord with embodiments of the invention.

FIG. 8 depicts a flowchart 800 for identifying and delivering content over cellular network 140 using social network 106 according to some embodiments. Where applicable, the disclosure of FIG. 8 may refer to components of FIGS. 1-5 for illustrative purposes. The embodiments disclosed by flowchart 800, however, are not limited to the features shown in the previous figures.

Step 802 executes by identifying content posted within the social network. The content is tagged according to the type of content (audio, video, graphic, text, and the like), source, length, and the like. Preferably, the content is posted on a page or an account within social network 106. The content should be delivered to mobile device 110 over cellular network 140, or alternatively, over an Internet network 104, via social media application 246.

Step 804 executes by performing an analysis to determine a likelihood of the identified content being selected by the end user of mobile device 110 and social network application 246. As disclosed above, embodiments may take into account historical data aggregated by social network 106, preferably using content engine 108. Step 806 executes by accessing the data stored in the various databases associated with social network 106.

Step 808 executes by determining a likelihood of the identified content being selected. With the data from social network 106, heuristic analysis may be performed to determine a likelihood that the user would request delivery of the content to mobile device 110. A heuristic may be defined by the user or social network 106 or social network application 246. The heuristic takes into account the historical data to determine a value for the likelihood. Using an example, step 808 may determine that a user selects a video posted by a friend in the social network 80% of the time. Thus, a likelihood value can be determined using this relationship.

Step 810 executes by comparing the likelihood value to a policy. Referring back to FIG. 6, the policy may be stored in a policy database. Preferably, it also is stored on mobile device 110. Thus, social network application 246 may receive information about the tagged content and a likelihood value to compare against the policy.

Step 812 executes by determining whether the policy allows delivery of the content to mobile device 110. For example, the policy may not allow any content to be delivered lower than a 50% likelihood of being selected by the user. The policy also may prohibit certain types of content from being delivered, such as video, to keep data usage low. The policy also may prohibit content of a certain nature, like adult content. As noted above, the policy may be adjusted by the user and stored in the policy database.

If step 812 is no, then step 814 executes by not delivering the content to the user on mobile device 110. This does not mean the content will not be available to the user at all. The user may still access the content via a webpage or application on another device, such as a computer connected to a network. Further, the user may navigate the content within social network 106.

If step 812 is yes, then step 816 executes by determining whether cellular network 140 has the resources available to deliver the content. As noted above, if the cellular network is experiencing bandwidth stress or problems with throughput over the network, then delivery of the content may not be feasible. Thus, step 822 executes if step 816 is no by waiting until mobile device 110 is connected to a wireless network, such as Internet network 104, to deliver the content. Referring to FIG. 2, mobile device 110 may connect to social network 106 through either network.

If step 816 is yes, then step 818 by pulling the content for delivery over cellular network 140. Step 820 executes by delivering the content to mobile device 110 and caching it in memory 240 until the user opens social network application 246. Then, the content may be viewed, listened to, and the like. Thus, content on the social network is prefetched according to data provided by the social network and conditions of the cellular network. This optimizes delivery as using both components (social and cellular networks) reduces the amount of content that probably will not be selected by the user on the mobile device.

According to some embodiments, not all content delivered will be selected by the user. Delivery of content ignored by the user of the mobile device may occur. The processes disclosed herein, however, identifies and optimizes the delivery of the content using resources and information provided by the cellular network and the social network.

The processes shown in FIGS. 6 and 7 provide functionality to improve the delivery of content to mobile device 110. The identified content may be cached on mobile device 110 in memory 240 so that when social network application 246 is launched, the content is available. Mobile network 140, however, may prevent the prefetch operation when it is experiencing a stressful bandwidth issue.

The process software (decentralized discovery across different networks) is shared, simultaneously serving multiple customers in a flexible, automated fashion. It is standardized, requiring little customization, and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload. The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider. In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

The process software (decentralized discovery across different networks) may be deployed, accessed and executed through the use of a virtual private network (VPN), which is any combination of technologies that can be used to secure a connection through an otherwise unsecured or untrusted network. The use of VPNs improves security and reduces operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e., the software resides elsewhere), wherein the lifetime of the VPN is limited to a given period of time or a given number of deployments based on an amount paid.

The process software may be deployed, accessed, and executed through either a remote-access or a site to-site VPN. When using the remote-access VPNs, the process software is deployed, accessed, and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed and executed through the use of dedicated equipment and large-scale encryption used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding some computer program instructions for executing a computer process.

The present invention may be a system, a method, and/or a computer program product. The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A computer program product for delivering content to a mobile device over a cellular network using a social network, the computer program product comprising a computer readable storage medium having program instructions embodied therewith, the program instructions readable by a processor to cause the processor to perform a method comprising:
   identifying content posted within the social network;
   performing an analysis to determine a likelihood of the content being selected based on aggregated consolidated data within the social network corresponding to a social network application on the mobile device, the aggregated consolidated data comprising an association of actions of a user with respect to the social network with relationships of the user with other members of the social network;
   comparing the likelihood of the content being selected to a policy stored in a policy database associated with the social network, the policy for identifying possible content to be prefetched;
   determining, based on available cellular network resources, whether the cellular network is allowed to deliver the content; and
   pulling the content for delivery to the mobile device.

2. The computer program product of claim 1, wherein the program instructions for the performing the analysis include determining a type of the content posted.

3. The computer program product of claim 1, wherein the program instructions further comprise program instructions for declining to pull the content for delivery when the cellular network is determined to not have adequate bandwidth for delivery.

4. The computer program product of claim 3, wherein the program instructions further comprise program instructions for delivering the content when the mobile device is connected to a wireless network.

5. The computer program product of claim 1, wherein the program instructions further comprise program instructions for caching the content into a memory of the mobile device upon delivery via the cellular network.

6. The computer program product of claim 1, wherein the program instructions for comparing the likelihood of the content being selected include comparing the likelihood to a percentage for the content according to the policy.

7. The computer program product of claim 6, wherein the program instructions further comprise program instructions for declining delivery of the content if the likelihood is below the percentage according to the policy.

8. A computer method for delivering content to a mobile device over a cellular network using a social network, the computer method comprising:
   identifying content posted within the social network;
   performing an analysis to determine a likelihood of the content being selected based on aggregated consolidated data within the social network corresponding to a social network application on the mobile device, the aggregated consolidated data comprising an association of actions of a user with respect to the social network with relationships of the user with other members of the social network;
   comparing the likelihood of the content being selected to a policy stored in a policy database associated with the social network, the policy for identifying possible content to be prefetched;
   determining, based on available cellular network resources, whether the cellular network is allowed to deliver the content; and
   pulling the content for delivery to the mobile device.

9. The method of claim 8, wherein the performing the analysis includes determining a type of the content posted.

10. The method of claim 8, further comprising declining to pull the content for delivery when the cellular network is determined to not have adequate bandwidth for deliver.

11. The method of claim 10, further comprising delivering the content when the mobile device is connected to a wireless network.

12. The method of claim 8, further comprising caching the content into a memory of the mobile device upon delivery via the cellular network.

13. The method of claim 8, wherein the comparing the likelihood of the content being selected includes comparing the likelihood to a percentage for the content according to the policy.

14. The method of claim 13, further comprising declining delivery of the content if the likelihood is below the percentage according to the policy.

15. A computer system for delivering content to a mobile device over a cellular network using a social network, the computer system comprising one or more computer readable storage medium having program instructions embodied therewith, the program instructions readable by a processor to cause the system to perform a method comprising:
   identifying content posted within the social network;
   performing an analysis to determine a likelihood of the content being selected based on aggregated consolidated data within the social network corresponding to a social network application on the mobile device, the aggregated consolidated data comprising an association of actions of a user with respect to the social network with relationships of the user with other members of the social network;
   comparing the likelihood of the content being selected to a policy stored in a policy database associated with the social network, the policy for identifying possible content to be prefetched;
   determining, based on available cellular network resources, whether the cellular network is allowed to deliver the content; and
   pulling the content for delivery to the mobile device.

16. The computer system of claim 15, wherein the program instructions further comprise program instructions for declining to pull the content for delivery when the cellular network is determined to not have adequate bandwidth for deliver.

17. The computer system of claim 16, wherein the program instructions further comprise program instructions for delivering the content when the mobile device is connected to a wireless network.

18. The computer system of claim 15, wherein the program instructions further comprise program instructions for caching the content into a memory of the mobile device upon delivery via the cellular network.

19. The computer system of claim 15, wherein the program instructions for comparing the likelihood of the content being selected include comparing the likelihood to a percentage for the content according to the policy.

20. The computer system of claim 19, wherein the program instructions further comprise program instructions for declining delivery of the content if the likelihood is below the percentage according to the policy.

* * * * *